UNITED STATES PATENT OFFICE.

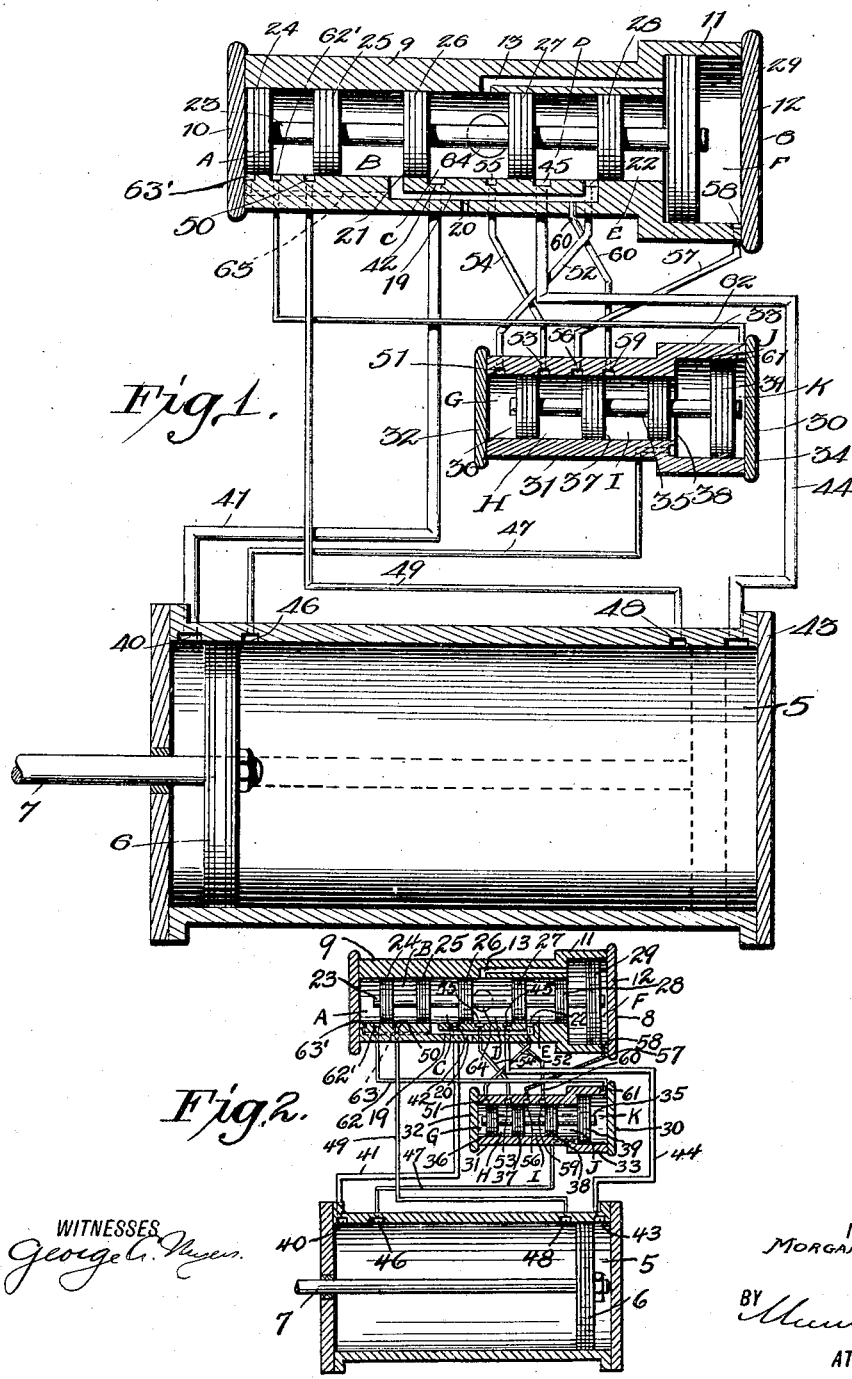

MORGAN JEFFERSON JOHNS, OF MILES CITY, MONTANA.

AUTOMATIC PRESSURE-OPERATED VALVE FOR ENGINES OR PUMPS.

1,394,679. Specification of Letters Patent. Patented Oct. 25, 1921.

Application filed July 24, 1919. Serial No. 312,930.

*To all whom it may concern:*

Be it known that I, MORGAN J. JOHNS, a citizen of the United States, residing at Miles City, in the county of Custer and State of Montana, have invented new and useful Improvements in Automatic Pressure-Operated Valves for Engines or Pumps, of which the following is a specification.

My invention relates to valve mechanism for effecting the inlet and exhaust of fluid pressure to and from a cylinder, for reciprocating a piston therein, and has particular reference to such valve mechanism which is wholly automatic in operation and is actuated by fluid pressure.

An important object of the invention is to provide a valve mechanism of the above mentioned character, which is adapted to dispense with all connecting rods, or the like between the piston and the sliding valve elements, thereby eliminating the leakage ordinarily accompanying the same.

Other objects and advantages of the invention will be apparent during the course of the following description.

In the accompanying drawings forming a part of this specification, and in which like numerals are employed to designate like parts throughout the same, Figure 1 is a central vertical sectional partly diagrammatic view through apparatus embodying my invention.

Fig. 2, is a similar view showing the parts in position opposite to the showing in Fig. 1.

In Fig. 1, the numeral 5 designates a main cylinder, shown as horizontally arranged, but the same may be disposed vertically if desired, and receiving therein a reciprocatory piston 6, connected with a piston rod 7.

The numeral 8 designates a main valve device, as a whole, embodying a preferably horizontal cylinder 9, having one end closed by a head 10 and provided at its opposite end with an enlarged chamber 11, having an increased diameter, and closed by a head 12. In one side of the cylinder 9 is formed a constant pressure port 13, leading from intake chamber C into the inner end of the enlarged portion or chamber 11. The opposite side of this cylinder 9 has an exhaust passage 19, which communicates with the atmosphere through an opening 20 and leads into the cylinder 9 at spaced points 21 and 22.

Mounted to reciprocate within the cylinder 9 is a piston valve rod 23, to which are rigidly secured piston valves 24, 25, 26, 27, 28 and 29, forming chambers A, B, C, D, E and F, as shown.

The numeral 30 designates a pilot valve assembly 8, comprising a preferably horizontal cylinder 31, provided at one end with a head 32, and at its opposite end with an enlarged chamber 33, having a head 34.

Mounted to reciprocate within the cylinder 31 is a piston valve rod 35, to which are rigidly secured piston valves 36, 37, 38 and 39, forming with the cylinder chambers G, H, I, J, and K, as shown.

The main cylinder 5 is provided at one end with a main port 40, in communication with a conduit 41, leading into a main port 42, of the same size in the main valve assembly, and having communication with the chamber C of such valve. At its opposite end the main cylinder 5 has a main port 43, in communication with a conduit 44, leading into a main port 45 in main valve assembly 8, adapted for communication with the chamber D of such valve. The main cylinder 5 is provided inwardly of and near and spaced from the main port 40 with an auxiliary port 46, having a substantially smaller diameter than the port 40. This auxiliary port 46 leads into a conduit 47, which discharges into the chamber J at the left of the piston valve 39. The cylinder 5 is provided inwardly of and near and spaced from the main port 43 with an auxiliary port 48, leading into a conduit 49, which leads into a port 50, having communication with the chamber A of the cylinder 9 of main valve 8. The port 48 has a substantially smaller diameter than the port 43.

The cylinder 31 is provided with a port 51, leading into a conduit 52, discharging into the exhaust port 20 of the main valve, at the point 22. The port 51 is in communication with the chamber G of the pilot valve. A port 53 is in communication with the chamber H of the same, and is connected with a conduit 54, leading into a port 55, in communication with the chamber C. The chamber H is also adapted to have communication with a port 56, leading into a conduit 57, in communication with a port 58, leading into the enlarged chamber F. A port 59 is adapted to communicate with the chamber I, and leads into a conduit 60, discharging into the exhaust port 20 of the main valve. A port 61 leads into the enlarged chamber K, and has communication with a conduit 62 which discharges into the chamber A of main valve. A port 63 leads from this chamber A upon the left side of piston valve 24 to the left end of exhaust port 20. The chamber C has an inlet 64 for the fluid pressure to enter the chamber. The elements 28 and 29 constitute a differential piston.

The operation of the apparatus is as follows:

Fluid pressure, such as steam or compressed air is introduced into the chamber C through the inlet 64. As shown in Fig. 1, the several piston valves of the main valve device are shifted to the left so that the chamber C is in communication with the conduit 41, and fluid pressure is thereby supplied to the left end of the cylinder 5, to move the piston 6 to the right. As soon as the piston 6 passes the port 46, the fluid pressure is supplied to the conduit 47 to the differential chamber J of the pilot valve device, holding the piston valves of this device in the correct position. The chamber K is now in communication with the atmosphere, through port 61, conduit 62, chamber A, port 50, conduit 49, port 48, the right end of cylinder 5, port 43, conduit 44, port 45, port 22, and through port 20 to the atmosphere. When the main piston 6 is shifted to the right end of its travel, it will pass beyond the auxiliary port 48, and closing this port to the port 43 and to the exhaust. The fluid pressure will now pass through port 48, conduit 49, port 50, chamber A, conduit 62 and through port 61 into the chamber K. The pressure within the chamber K will overcome the pressure in the chamber $j$ because of differential piston areas, thereby shifting the rod 35 and its piston valves to the left. When the rod 35 is in this position, the port 53 which maintains constant pressure from chambers C to H is closed from the port 56 by the piston valve 37. At this time, the port 58 is placed in communication with the exhaust, through conduit 57, port 56, chamber I, port 59, conduit 60 and port 20. This will allow the fluid pressure to escape from the chamber F and the constant pressure within the chamber E will then shift the rod 23 and its piston valves to the right also because of differential piston areas. The main port 40 is now placed in communication with chamber B, exhaust port 21 and 20, and pressure will exhaust from this end of the cylinder 5. At the same time the port 43 is placed in communication with the chamber C, through conduit 44, port 45. The fluid pressure is then supplied to the right end of the cylinder and will force the piston 6 to the left. When the rod 23 is thus shifted to the right the port 50 is closed and the port 62' is placed in communication with the passage 63 and with the exhaust port 20. The main valve pistons including the rod 23 will now be again shifted to the left to assume the original position. The main piston 6 will now pass the port 46, admitting pressure to the chamber J, causing the rod 35 and piston valves carried thereby to be again shifted to the right. The port 56 is now placed in communication with constant pressure 53, and fluid pressure will pass from the chamber C, through conduit 54 into port 56 and conduit 57 to the chamber F, thereby shifting the rod 23 and piston valves carried thereby to the left. The port 45 is now placed in communication with the exhaust 20, and communicates with the chamber K through the conduit 62. Fluid pressure is again supplied through the port 42 and 41 and through the port 40 into the left end of the cylinder 5. The port 51 is always in communication with the port 20 through conduit 52. Ports 63' at the left end of the cylinder 9 are always in communication with port 20 through port 63.

Notwithstanding the position of the piston and the several piston valves, before starting the piston 6, when the throttle valve is open to admit steam through the opening 64 in the chamber C, the valves will automatically assume the correct position, as chamber E is always open to chamber C, therefore the fluid pressure will travel through the main valve through the cylinder, and from there operate the valves in proper order.

Attention is called to the fact that when the piston valves of the main valve device are shifted to the left, exhaust pressure from the cylinder 5 may pass through port 48, conduit 49 and port 50, port 62' and conduit 62 into the chamber K, but this pressure within the chamber K will not then shift the piston valve carried by the rod 35 to the left, for the exhaust pressure will also enter ports 51 and conduit 47, thereby making the pilot valve pistons perfectly balanced, as far as exhaust pressure is concerned.

When the main valve pistons of the main valve device are shifted to the right, the conduit 62 is in communication with the port 63' and hence the chamber K is in communication with the exhaust. Consequently it might appear that pressure would enter the port 46, and pass through conduit 47 into the chamber J and cause the piston valves to be shifted to the right. This cannot occur for several reasons. The main steam passages or ports which furnish pressure and exhaust the same from the main cylinder 5 are much larger than the ports or passages. This being the case, the main port 42 is partly or half open to the exhaust before the port 62' has started to open, with the result that the exhaust pressure exerted through the port 62' to the chamber K on the piston 39 will be just as strong as the pressure through the port 46 to the chamber J, thereby making the main valve balanced, as far as the exhaust pressure is concerned, and after the main valve pistons have assumed the position to the right there is no pressure exerted on either end of the pilot valve.

In the drawings, I have shown the several ports connected by pipes, but it is obvious that these ports may be connected by passages formed in castings, and the invention is in no sense restricted to the employment of the pipe connections, which are shown principally to more clearly illustrate the invention.

Having thus described my invention, I claim:

An apparatus of the character described and comprising a main cylinder provided with main and auxiliary ports spaced apart, the auxiliary ports of less area than the main ports, a main piston mounted to reciprocate in said main cylinder, a pilot valve mechanism including a cylinder having an enlarged chamber at one end, a piston rod mounted to reciprocate in said cylinder and carrying a plurality of pistons of uniform diameter adapted to reciprocate in the body of said cylinder and a piston of greater diameter for the enlarged chamber, said pistons defining with the cylinder chambers of differential areas, conduits between one auxiliary port of the aforesaid main cylinder and the enlarged chamber of the pilot valve cylinder, conduits between the other auxiliary port of the main cylinder and the opposite end of the pilot valve, a main valve assembly comprising a cylinder having a body portion of uniform diameter and an enlarged chamber at one end, said main valve cylinder having an inlet chamber and a constant pressure port leading from the inlet chamber to the inner end of said enlarged chamber, an exhaust passage, a piston rod mounted to reciprocate in said main valve cylinder and carrying a plurality of uniform diametered pistons to reciprocate in the body of the main valve cylinder and a piston of greater diameter within the enlarged chamber thereof, said differential areas pistons defining chambers including the before mentioned inlet chamber, ports leading from said chambers, conduits connecting the ports of the main valve with the ports of the pilot valve, conduits connecting the main ports of the main cylinder with the exhaust of the main valve, the inlet chamber of the main valve being in communication with the chamber at the inner side of the enlarged piston, valve means connected with the main valve piston to control the passage of fluid pressure to the main ports of the main cylinder, and means for balancing the pistons of the pilot valve with respect to the exhaust pressure.

MORGAN JEFFERSON JOHNS.